United States Patent
Spector

(10) Patent No.: US 8,202,094 B2
(45) Date of Patent: *Jun. 19, 2012

(54) SYSTEM AND METHOD FOR TRAINING USERS WITH AUDIBLE ANSWERS TO SPOKEN QUESTIONS

(75) Inventor: Donald Spector, New York, NY (US)

(73) Assignee: Radmila Solutions, L.L.C., Dover, DE (US)

( * ) Notice: Subject to any disclaimer, the term of this patent is extended or adjusted under 35 U.S.C. 154(b) by 1088 days.

This patent is subject to a terminal disclaimer.

(21) Appl. No.: 10/983,066

(22) Filed: Nov. 5, 2004

(65) Prior Publication Data

US 2005/0064374 A1 Mar. 24, 2005

Related U.S. Application Data

(63) Continuation-in-part of application No. 09/990,048, filed on Nov. 20, 2001, now Pat. No. 6,830,452, which is a continuation-in-part of application No. 09/766,951, filed on Jan. 22, 2001, now Pat. No. 6,517,351, which is a continuation-in-part of application No. 09/025,347, filed on Feb. 18, 1998, now Pat. No. 6,227,863.

(51) Int. Cl.
G09B 5/00 (2006.01)

(52) U.S. Cl. ........ 434/169; 434/167; 434/118; 434/247; 434/322; 434/323; 434/350; 434/353; 434/362

(58) Field of Classification Search ............. 434/116, 434/156–157, 167, 169, 185, 323, 350, 118, 434/247, 322, 353; 704/1, 244, 251, 257, 704/270, 275, 278
See application file for complete search history.

(56) References Cited

U.S. PATENT DOCUMENTS

| | | | |
|---|---|---|---|
| 1,273,763 A | 7/1918 | Garman | |
| 1,394,620 A | 10/1921 | Haupt | |
| 3,491,196 A | 1/1970 | Stein | |
| 4,270,182 A | 5/1981 | Asija | |
| 4,688,192 A | 8/1987 | Yoshimura et al. | |
| 4,695,975 A * | 9/1987 | Bedrij | 715/202 |
| 4,698,758 A | 10/1987 | Larsen | |
| 4,783,803 A | 11/1988 | Baker et al. | |
| 4,803,729 A * | 2/1989 | Baker | 704/241 |
| 4,866,778 A | 9/1989 | Baker | |
| 4,884,972 A | 12/1989 | Gasper | |
| 5,027,406 A * | 6/1991 | Roberts et al. | 704/244 |
| 5,111,409 A | 5/1992 | Gasper et al. | |
| 5,133,012 A * | 7/1992 | Nitta | 704/251 |
| 5,220,639 A * | 6/1993 | Lee | 704/200 |
| 5,260,869 A | 11/1993 | Ferrier et al. | |
| 5,302,132 A | 4/1994 | Corder | |
| 5,306,153 A | 4/1994 | Foster | |
| 5,387,104 A * | 2/1995 | Corder | 704/270 |
| 5,393,236 A * | 2/1995 | Blackmer et al. | 434/169 |
| 5,429,513 A | 7/1995 | Diaz-Plaza | |
| 5,451,163 A | 9/1995 | Black | |
| 5,503,560 A * | 4/1996 | Stentiford | 434/167 |

(Continued)

Primary Examiner — Xuan Thai
Assistant Examiner — Alvin Carlos

(57) ABSTRACT

A phonics training system provides immediate, audible and virtual answers to questions regarding various images such as objects, animals and people, posed by a user when the user views such images on a video display terminal of the system. The system can provide virtual answers to questions without the need for an instruction or teacher and includes a computer having a video output terminal and an electronic library containing common answers to basic questions. This system can also include an artificial intelligence system.

44 Claims, 6 Drawing Sheets

U.S. PATENT DOCUMENTS

| | | | |
|---|---|---|---|
| 5,511,980 A | 4/1996 | Wood | |
| 5,554,033 A * | 9/1996 | Bizzi et al. | 434/247 |
| 5,649,060 A * | 7/1997 | Ellozy et al. | 704/278 |
| 5,676,551 A | 10/1997 | Knight et al. | |
| 5,680,511 A * | 10/1997 | Baker et al. | 704/257 |
| 5,692,906 A | 12/1997 | Corder | |
| 5,717,828 A * | 2/1998 | Rothenberg | 704/251 |
| 5,727,950 A | 3/1998 | Cook et al. | |
| 5,741,136 A * | 4/1998 | Kirksey et al. | 434/169 |
| 5,787,230 A * | 7/1998 | Lee | 704/235 |
| 5,799,267 A | 8/1998 | Siegel | |
| 5,799,279 A * | 8/1998 | Gould et al. | 704/275 |
| 5,810,599 A * | 9/1998 | Bishop | 434/157 |
| 5,813,862 A * | 9/1998 | Merzenich et al. | 434/185 |
| 5,815,147 A | 9/1998 | Bogen et al. | |
| 5,822,730 A | 10/1998 | Roth et al. | |
| 5,823,788 A * | 10/1998 | Lemelson et al. | 434/350 |
| 5,836,771 A | 11/1998 | Ho et al. | |
| 5,864,844 A | 1/1999 | James et al. | |
| 5,885,083 A * | 3/1999 | Ferrell | 434/156 |
| 5,893,720 A | 4/1999 | Cohen | |
| 5,927,988 A * | 7/1999 | Jenkins et al. | 434/116 |
| 5,953,692 A * | 9/1999 | Siegel | 704/1 |
| 5,957,699 A | 9/1999 | Peterson et al. | |
| 5,974,262 A | 10/1999 | Fuller et al. | |
| 6,019,607 A * | 2/2000 | Jenkins et al. | 434/116 |
| 6,023,697 A * | 2/2000 | Bates et al. | 707/4 |
| 6,036,496 A * | 3/2000 | Miller et al. | 434/156 |
| 6,071,123 A * | 6/2000 | Tallal et al. | 434/116 |
| 6,088,669 A * | 7/2000 | Maes | 704/231 |
| 6,134,529 A * | 10/2000 | Rothenberg | 704/270 |
| 6,146,147 A * | 11/2000 | Wasowicz | 434/169 |
| 6,151,575 A | 11/2000 | Newman et al. | |
| 6,159,014 A * | 12/2000 | Jenkins et al. | 434/169 |
| 6,160,987 A * | 12/2000 | Ho et al. | 434/350 |
| 6,185,534 B1 | 2/2001 | Breese et al. | |
| 6,186,794 B1 * | 2/2001 | Brown et al. | 434/116 |
| 6,195,635 B1 | 2/2001 | Wright | |
| 6,212,498 B1 | 4/2001 | Sherwood et al. | |
| 6,224,636 B1 | 5/2001 | Wegmann et al. | |
| 6,227,863 B1 | 5/2001 | Spector | |
| 6,249,763 B1 * | 6/2001 | Minematsu | 704/252 |
| 6,328,569 B1 * | 12/2001 | Jenkins et al. | 434/169 |
| 6,336,029 B1 | 1/2002 | Ho et al. | |
| 6,416,327 B1 * | 7/2002 | Wittenbecher | 434/247 |
| 6,498,628 B2 * | 12/2002 | Iwamura | 348/734 |
| 6,501,515 B1 * | 12/2002 | Iwamura | 348/734 |
| 6,501,937 B1 | 12/2002 | Ho et al. | |
| 6,511,324 B1 * | 1/2003 | Wasowicz | 434/167 |
| 6,517,351 B2 * | 2/2003 | Spector | 434/169 |
| 6,749,432 B2 * | 6/2004 | French et al. | 434/247 |
| 2002/0013707 A1 * | 1/2002 | Shaw et al. | 704/257 |
| 2002/0150869 A1 | 10/2002 | Shpiro | |
| 2003/0120493 A1 * | 6/2003 | Gupta | 704/270.1 |
| 2003/0200085 A1 * | 10/2003 | Nguyen et al. | 704/238 |

\* cited by examiner

SYSTEM AND METHOD FOR TRAINING USERS WITH AUDIBLE ANSWERS TO SPOKEN QUESTIONS

CROSS REFERENCE TO RELATED APPLICATIONS

This application is a continuation-in-part of U.S. application Ser. No. 09/990,048 filed Nov. 20, 2001 now U.S. Pat. No. 6,830,452 which is a continuation in part of U.S. patent application Ser. No. 09/766,951, filed Jan. 22, 2001, now issued as U.S. Pat. No. 6,517,351 on Feb. 11, 2003 which is a continuation-in-part of Ser. No. 09/025,347, filed Feb. 18, 1998, now U.S. Pat. No. 6,227,863, the entire contents of both applications being herein incorporated by reference.

FIELD OF THE INVENTION

The invention relates to a system and method for self-teaching, including self-teaching of those who are interested in learning such as young children, children having developmental disabilities or the elderly in the course of recovery such as recovery from a stroke. The system of this invention includes apparatus for sensing an audible word or command of a young child for effecting a computer generated response to this audible word or command, wherein this response can include a graphical depiction of the letters of this audible word or command, an object image related to this audible word or command, or any combination thereof. In addition to the graphical depiction generated by the computer response to audible words or commands, the system also provides audible answers preferably by a virtual teacher to questions orally posed by a child pertaining to the depiction displayed.

DESCRIPTION OF THE PRIOR ART

The main purposeful activity undertaken by young children is play. From a developmental perspective, play is often considered as practice for the child's later roles in life. Through play a child can explore the environment and gain knowledge regarding the physical laws governing objects, socialize with adults and peers to gain important interpersonal skills, and use his or her imagination and begin honing the pathways for conscious thought. Thus, it can be argued that play in humans is a tool leading to perceptual, conceptual, intellectual and language development, the basic building blocks required for the formulation of higher cognitive functions.

For healthy children, very early childhood play is either oriented toward physical objects or toward symbol manipulation. Meaningful verbalizations may not yet be possible. However, eventually through play, the child begins to attach specific names to objects. Soon afterwards, more complex sentences are learned and the child talks to himself or herself in order to achieve specific activities. Meaningful self-speech, when activity and verbalization merge and the child can say what he or she is doing, is believed to be a significant point in intellectual development. Self-speech is eventually made non-verbal, and we talk to ourselves through specific mental activities. This is often referred to as self-reflective activity and occurs throughout childhood and even adulthood. For self-reflective activity to occur, one must be able to recall and manipulate specific memory events. The brain system that this refers to is working memory which is theorized to have both a verbal/language component, a phonological loop, and a visual imagery component, the visuospatial sketch pad.

The child's brain is different from the adult brain in that it is a very dynamic structure that is evolving. A two year old child has twice as many synapses (connections) in the brain as an adult. The young brain must use these connections or lose them. Thus, failure to learn a skill during a critical or sensitive period has important significance.

It is known that the greatest period of intellectual development potential for a child is before the age of three. However, children do not normally start any formal education until age five or six, and infants typically in an ideal family only receive one to two hours of daily intellectual stimulation.

It would, thus, be advantageous to provide a virtual play and educational environment for children, including those children whose learning experiences have not been adequately developed, or for medical reasons have been slow to develop. Such a virtual educational environment would be advantageous for several reasons: developmental milestones may be achieved more quickly; the child may learn to distinguish between images and scenes created from multiple images; and it may give the child a vehicle for self-reflective activity and thus be a seed for the development of imagination, consciousness, and communication. One such virtual learning environment system is described in U.S. Pat. No. 5,815,147 (to Bogen, et al. issued Sep. 29, 1998).

Notwithstanding the advances set forth in Bogen, et al, i.e., virtual play environment, the potential of such environment has been limited by its focus on children with limited interactive capabilities, and the fact that interacting is preprogammed and not based on the child's spontaneous behavior. Clearly the potential of such a system, which has yet to be more fully realized either by both children with special needs, or by children not similarly encumbered, has not been fully realized because of such limited focus (children with learning or physical disabilities). Thus, the Bogen, et al, system is inherently limited because of its failure to provide adequate interaction of the child with the virtual play environment through the use of multiple interactive input; and, a more varied or comprehensive set of learning objectives (lessons) to retain the child's interest. Accordingly, there continues to exist a need for such enhancement so as to provide a learning environment wherein each child, including those with limited physical and/or emotional development, can cause the environment to react with it in some meaningful and responsive way; and, encourage the child to look beyond a possible limited learning environment to related subjects in alternative sources of such information.

It is, therefore, an object of this invention to provide a computer training system for self-teaching, particularly for young children. A further object of the invention is to provide a virtual environmental system for those children whose learning experiences have not yet adequately developed, or for medical reasons have been slow to develop. Another object of this invention is to provide a training system for a child of pre-school age, which system can provide an audible response to questions posed orally by such child with respect to words and/or images appearing on a video display terminal of such system. Another object of this invention is to provide the depiction of a virtual teacher on a video display terminal, who audibly answers questions posed orally by a child using the system. These and other objects will readily become apparent to those skilled in the art in light of the teachings herein set forth.

SUMMARY OF THE INVENTION

In its broad respect, this invention relates to a computer training system having one or more input and output devices for effecting interactive communications with the learning system and a video display terminal for graphical depictions of the system response to the output devices, wherein the interactive communication is prompted by one or more user initiated inputs. The system can comprise:

a) means for processing information generated by a user of the virtual learning system;

b) means for displaying on said video display terminal, information generated by the virtual learning system in response to the information generated by the user;

c) means for the presentation in audible or video form by the user inquiries regarding the information observed on the display terminal;

d) an electronic library of answers to inquiries which commonly arise from viewing the information; and e) means for the recognition of words spoken in the user's inquiry and rendering, via the output device from the library, the answer most closely related to at least some of the works and their sequences as presented in the inquiry.

This device and system can also include a system for allowing individual users to customize their profiles and to teach the system and device to learn particular nuances and styles of the users.

For example, this device can also include an artificial intelligence means which can include a system for learning about the styles or nuances of the user. One example could be a system that learns particular speech patterns of a user so that if a user was not able to form otherwise comprehensible speech patterns, the system could learn and adapt to the speech patterns of the user.

Some users such as young children may not be able to form full phonetic sounds. Therefore, a young child may only be able to form the "ka" or "ca" sound in response to a picture or an image of a cat. Therefore, this system could then learn that this incomplete pronunciation of the word cat is a sufficient answer to the image or picture of a cat for that particular user.

Alternatively, if the user had an accent, but otherwise no speech difficulty, then the user could adjust the system to recognize the pronunciation of the word "cat" so that the system would provide a set of correct instructions in the future. For example, the system which can be in the form of a computer such as a personal computer, can have the virtual learning system installed therein, and also an additional artificial intelligence system installed, which can then be customized to learn the particular actions or speaking patterns of the user.

Alternatively, this additional artificial intelligence system may be installed on an additional computer or machine such as a personal computer disposed adjacent to the computer for running the additional artificial intelligence system. In another embodiment, this additional artificial intelligence system could be disposed on a server or other computer which may be accessed through the Internet.

The system can also include a means for allowing a user to customize the learning process including customizing the voice or image of an instructor so that this voice can be a voice that is familiar to the user/person. To achieve this result, the responses can be modified through a voice sampling system which then mimics the pronunciation, accent and speaking style of the computerized response so that the voice and "personality" would represent a familiar person either alive or deceased.

Thus, one benefit of these features, is that while the virtual learning system can issue predetermined responses which are triggered by audible sounds, causing an image of the instructor to appear and provide answers to a lesson plan, the system can also provide personalized vocabularies that are specific to a student, child or patient. This system also allows questions to go into an Internet Computer databank, which can answer these questions. In addition, using artificial intelligence, this process can develop to become a Cyber instructor or a companion.

Part of this artificial intelligence includes an expanded ability for voice to text, and text to voice transmissions which allows a specialized or customized interpretation of audible signals or visual movements, and a specialized or customized output of a particular voice, pattern or image of an instructor.

While the self-teaching system of the present invention is particularly useful for young children, it can, of course, find application in the studies of older students and even in training of adults.

DESCRIPTION OF THE PREFERRED EMBODIMENT

Figure 1:
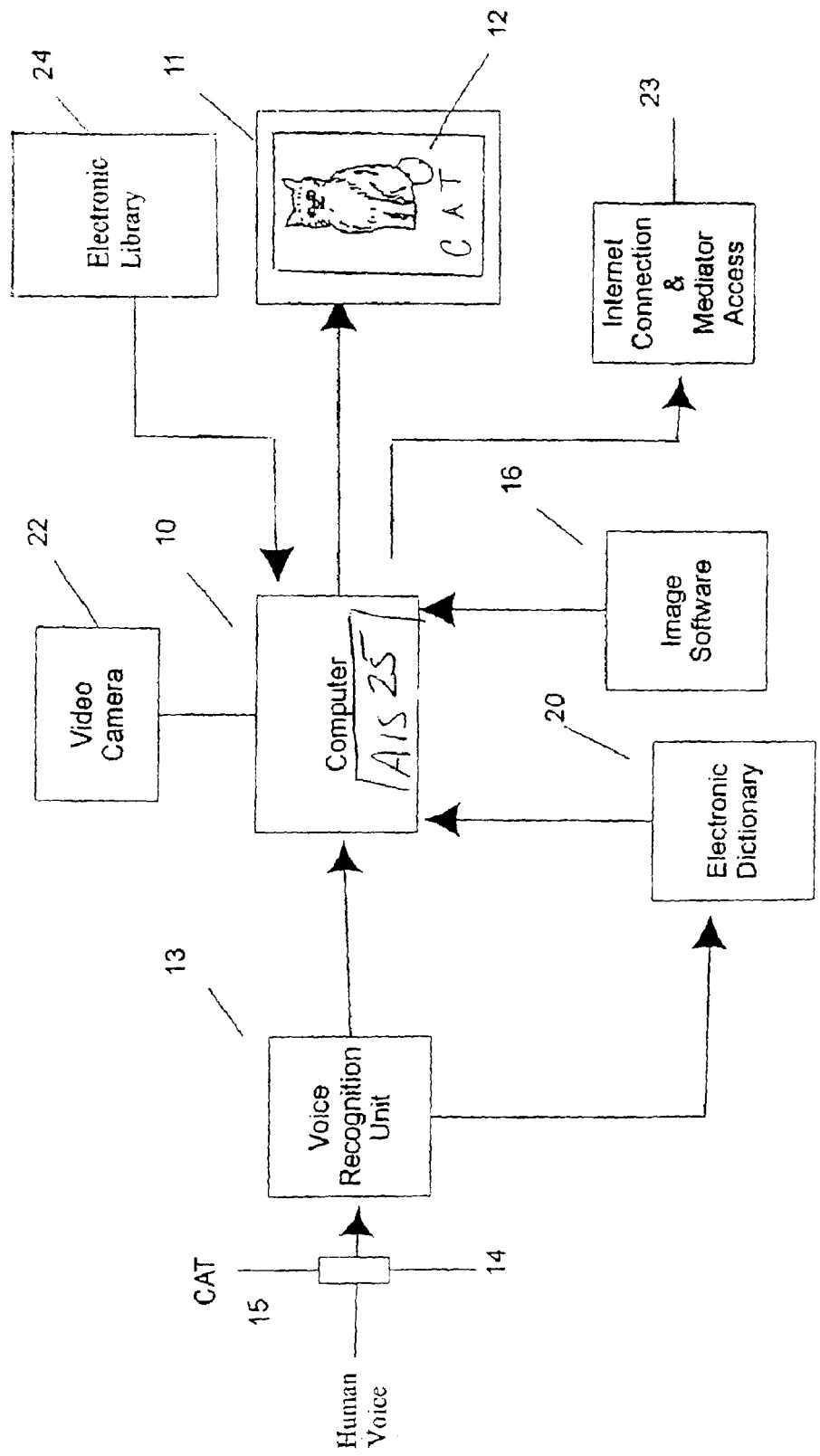
FIG. 1 depicts the virtual learning environment system of this invention.

The training system of the present invention is a virtual learning environment system as shown in FIG. 1.

The system comprises a general-purpose programmable computer, such as personal computer 10, a visual display means or device 12 (preferably a touch screen visual display device), and appropriate input/output devices such as a microphone and/or speaker, a keyboard, a mouse not shown, and a video camera 22, and could also include a single switch input device (joy stick) not shown. Computer 10 also has access to the Internet via Internet access port 23. Depending upon the age and the extent of the user's physical abilities, either the touch screen video display device, microphone, the keyboard, mouse, or joy stick, or any combination thereof, may be used as one means for selecting and manipulating objects shown on the display. In a preferred embodiment of the virtual learning environment illustrated herein, the computer 10 is programmed to provide a non-directed play environment for the user in the form of real or simulated images, and an electronic library 24 associated with the computer in which are electronically stored answers to commonly asked inquiries resulting from the observation of images.

Referring now to FIG. 1, illustrated therein is an educational training system in accordance with the invention that includes a digital computer 10 having a central processing unit (CPU). The output of computer 10 is coupled to a video monitor or terminal 11 having a screen 12 on which may be presented the letters of the alphabet which spell a word spoken into the system by a pre-school child, an image of the object identified by this word, or real or simulated images, visual images generated by image software 16 and/or video camera 22. Also, computer 10 is coupled to an electronic library 24, having voice response means for orally providing answers to questions posed through voice recognition unit 13.

In the input of computer 10 is a peripheral in the form of a voice recognition unit 13 coupled to a microphone 14. When a pre-school child (or other speaker) speaks into microphone 14, unit 13 then recognizes the distinctive pattern of sounds in the voice of the child, and converts these sounds into digitized signals that are fed into computer 10 and processed therein.

Associated with computer 10 is an electronic phonetics database or dictionary 20. Digitally stored in the electronic phonetics library are both the phonetic sounds which constitute the words contained in the dictionary. The contents of this dictionary are downloaded into the memory of the computer.

The voice recognition unit 13 is operatively coupled to the electronic phonetics dictionary 20, so as to condition this dictionary to render it responsive to the distinctive voice pattern of the child using the system. Thus, while the phonetic sounds of the words digitally stored in the electronic dictionary are synthetically generated sounds, not sounds derived from a human voice, the dictionary must be able to compare a word or phrase spoken by a pre-school child with the same word or phrase stored in the dictionary. In order to be able to do so, before the child uses the system, he or she first speaks for a few minutes into the voice recognition unit to permit the unit to analyze the voice of the child and then recognize its unique pattern.

The electronic-dictionary 20 has digitally stored therein a vocabulary of words and letters of the alphabet which spell each word. When a child speaks into the input of the computer, the computer scans the words in the dictionary to find the stored digitized sounds of the word from the voice recognition unit 13.

When a match is found by the computer, then the letters or the word yielded in the output of the computer are presented on screen 12 of the computer terminal 11. Hence, the child can see how the word he has just spoken into the computer is spelled.

Also associated with computer 10 is an image software module 16, having stored therein a library of digitized images, each being a picture or drawing of an object identified by a respective word included in the vocabulary of the electronic dictionary. Thus, if the dictionary contains the word DOG, CAT, BOY, HOUSE and BOTTLE in the module 16, there will be a picture or drawing of each of these objects.

When computer 10 responds to an incoming word, such as CAT, and presents on screen 12 the spelling of CAT, it at the same time presents on the screen an image of a cat.

Thus, whatever word is spoken into the input of the computer by a child using the system which identifies an object, this causes the computer to yield in its output terminal the letters spelling this word, and an image of the object identified thereby.

In this way, a pre-school child using the system is taught how to spell the words which are included in his vocabulary, while seeing for each word an image of the object presented by the word. This serves not only to impress on the child's mind the spelling of the word, but also serves to clarify its meaning. Thus, if a pre-school child is confused as to the distinction between the words BOY and BOOK, when he says the word BOOK and then sees a book on the screen, he knows that a book is not a boy.

In practice, the system need not be confined to words that are nouns and identify objects, for the system can-include verbs and adjectives commonly used by pre-school children, such as RUN, JUMP, BIG and LITTLE. In order to illustrate these verbs and adjectives, the image software 16 must include appropriate illustrations. Thus, RUN can be illustrated by a child running, BIG by a giant and SMALL by a midget.

One may use as images cartoon characters that most children are familiar with, having seen them on TV shows for children. Thus, PLUTO, the Disney character, can be used to represent a dog, and DONALD DUCK to represent a duck.

It is also useful for teaching pre-school children to spell and read, to include arithmetic numbers such as the digits one to ten, and how these digits are spelled. When children learn how numbers are spelled, they can read stories that refer to "three bears" or "five chairs."

In the learning process, it is desirable when a child is shown how to spell a word, that he then be required to spell the word aloud, for in doing so, one then knows whether the child has learned the spelling.

The system may be modified to test the pre-school child to determine whether he remembers how a word is spelled. Thus, after a child sees how the word CAT is spelled on screen 12, he may then be requested to speak into the microphone how this word is spelled by saying the letter C, then the letter A, and finally the letter T.

In accordance with one aspect of the invention, there is also included video camera 22, which can, for example, be focused on an infant in his or her crib. Movements from the infant can be detected by the video camera, digitized and applied to computer 10. Those movements, which initially may be random, can be utilized to allow the infant to begin to learn how to manipulate objects in a virtual environment. For example, if the infant initially moves his or her arm, this could result in movement of an object in the virtual environment causing the object to be moved from a first location to a second location depending on the particular movement of the infant. As the infant would continue to make random movements, there would be provided feedback from video monitor 11, which would indicate to the infant a positive indication of the correct movement to move a particular object in the virtual environment. In this manner, the infant would gradually learn the movements required to move objects in the virtual environment.

The invention also provides for a mediator to monitor the user's progress via connection to the Internet. For example, if the infant user successfully accomplished a particular task, the system could be modified to provide a new task for the user, or alternatively provide feedback to a caregiver on the progress of the infant user.

In addition, the connection to the Internet could also be used to provide additional information to be displayed on video monitor 11.

In the teaching system shown in FIG. 1, a child sees on the screen of the computer terminal the spelling of the word he has spoken into the computer and an image of the object identified by this word. But, the system depends on the ability of the child to speak into the computer the many words he knows, yet there is nothing to spur the child to speak words he uses infrequently. Thus, it may not occur to the child to speak the word BEAR or COW, for he rarely has occasion to use these words even though he knows them.

In order, therefore, for the child to exploit all of the words phonetically stored in the electronic dictionary 20, the training system may include a random access selector which may be actuated by the child or a caregiver using the system.

When the child or a caregiver activates a random access, selector, it then chooses at random the stored digitized sounds of one of the words in the dictionary, say BEAR, and feeds those sounds to an analog-to-digital converter D/A. The converter yields an analog signal of BEAR. This signal is amplified in an analog amplifier, and then reproduced by a loud speaker.

Thus, each time the child or a caregiver accesses the random access selector he or she hears a word randomly selected from the phonics dictionary. Because the child does not know what word to expect, this lends interest to this operation. The child must then speak the word he has just heard into the computer input, so that he can now see how it is spelled and what object it identifies.

Thus, the child may not have in his working vocabulary the word BOAT. But, when he hears this word extracted from the dictionary and speaks it into the computer, the child is then informed as to the meaning of this word by an image of a boat and how it is spelled.

In this way, the child is encouraged to explore the entire electronic dictionary rather than only those words that come to mind when using the training system.

Alternatively, one may provide a dedicated computer in whose memory is stored the electronic dictionary and the library of digitized images to provide a self-sufficient and compact device for home use by a pre-school child, or for use in an elementary school.

If, in the first grade of an elementary school, the students are given a simple story book to read, the dedicated computer in its electronic dictionary can include all of the words in the book except for articles and propositions. In this way, a child who masters the spelling of the words in the electronic dictionary will experience no difficulty in reading the book.

A further unique feature of the aforementioned training system allows a child of pre-school and elementary school age to actually pose questions to the system and receive a digitized oral answer to questions which a child of that age might be expected to ask after viewing an image on the video display terminal 11. The oral answer can be given on the display terminal by a virtual teacher so that the young child might believe he or she is hearing directly from a live person via the computer.

The child can access the library to obtain answers to commonly asked questions by speaking the questions into the training system. When words such as what, which, where, why, when, if, or other suitable words are spoken, the library is scanned for the words in the questions which when taken together will select the closest answer to the question used.

It may also be feasible for an icon such as a question mark to appear on the display terminal when the child is using the computer training system. When the child wishes to pose a question, he or she can click on the icon, and have immediate access to the library or answers for the spoken question.

The computer thereupon makes a determination of what is on the display terminal and searches the electronic library for the appropriate answer to the questions. Upon selection of the answer, it is conveyed to the child electronically by a digitized voice given simultaneously with a image on the display terminal.

For example, a pre-school child in using the training system may speak the word CAR and observe the image of an automobile on the video display terminal, with the letters C-A-R appearing, and a virtual teacher sounding the word CAR and also spelling aloud the letters C-A-R.

In viewing the image of the car on the display terminal, the child may not know the word for the color of the particular car depicted. By asking "what is the color of the car," the library scans its data bank and finds the closest answer to the words WHAT; CAR; and COLOR, and a virtual teacher appears on the display terminal screen and orally announces that the car shown is BEIGE, while both spelling and pronouncing the word one or more times.

A more mature child may want to know the year and model of the same car, and pose the questions "what is the year and producer of the car?" After scanning the library data bank, a dialog box appears and the virtual teacher will announce that it is a 2001, Ford.

Hence, by using the present training system, the child can have immediate access to answers to questions which might enter his or her mind upon viewing an image on the video display terminal. With continued use of the training system, the child will readily accept the presentation of answers by a virtual teacher as though a human were providing the answers as each question was presented.

The training system of the present invention, therefore, provides a learning environment which in the mind of the child approximates reality about what appears on the video display terminal. The child asks a question by speaking and receives an immediate audible answer from a virtual teacher. In view of the oral presentation of a question and the immediate receipt of an oral answer, it is as if a human teacher were present in the room and available to answer the child's questions.

The advantage of using the system of this invention is that it does not require the presence of a teacher to answer commonly asked questions by the user. Depending upon the complexity of the images or material appearing on the video display terminal, most simple questions can be virtually answered immediately after the question is posed.

The absence of a live teacher will, of course, be a great savings of time and expense.

However, a virtual teacher appearing on the video display unit with the answer to the inquiry will give the child the sense that his or her question is being answered by a teacher who actually is providing the answer.

A further advantage is that the answer to a question appears immediately If a child cannot get an immediate answer, he or she may forget to ask the question of a teacher at a later date and hence deprive themselves of added knowledge.

While many of the tutorials which come with new software display an animated character or person who audibly comments on whether the operator has performed a function properly or not, there is no means for presenting audibly or otherwise a question and receiving an audible answer from a virtual teacher.

A child using a training system which does not provide immediate answers to questions that the child might have, may be reluctant or forget to raise the question at a later date. By obtaining an immediate answer to his or her questions, the knowledge of the child is enhanced which otherwise may not occur until later, or forgotten by the child.

In this case as shown in FIG. 1, computer 10 can also include an artificial intelligence system AIS 25 which can be incorporated within computer 10 in the form of software installed on computer 10 or as firmware/hardware, incorporated within computer 10. An example of software relating to artificial intelligence in the field of voice recognition systems is shown by U.S. Pat. No. 4,783,803 issued on Nov. 8, 1988 the disclosure of which is hereby incorporated herein by reference. Other software systems using a similar system are known from the following U.S. Pat. No. 6,224,636 to Wegmann et al issued on May 1, 2001; U.S. Pat. No. 6,212,498 to Sherwood et al issued on Apr. 3, 2001; U.S. Pat. No. 6,195,635 to Wright issued on Feb. 27, 2001; U.S. Pat. No. 6,151,575 to Newman et al issued on Nov. 21, 2000; U.S. Pat. No. 5,822,730 to Roth et al issued on Oct. 13, 1998 and U.S. Pat.

No. 4,866,778 to Baker issued on Sep. 12, 1989 wherein the disclosures of these patents are hereby incorporated herein by reference. These systems include a system and a program for learning and adapting to a particular user's ability based upon a particular user's profile.

Figure 2:
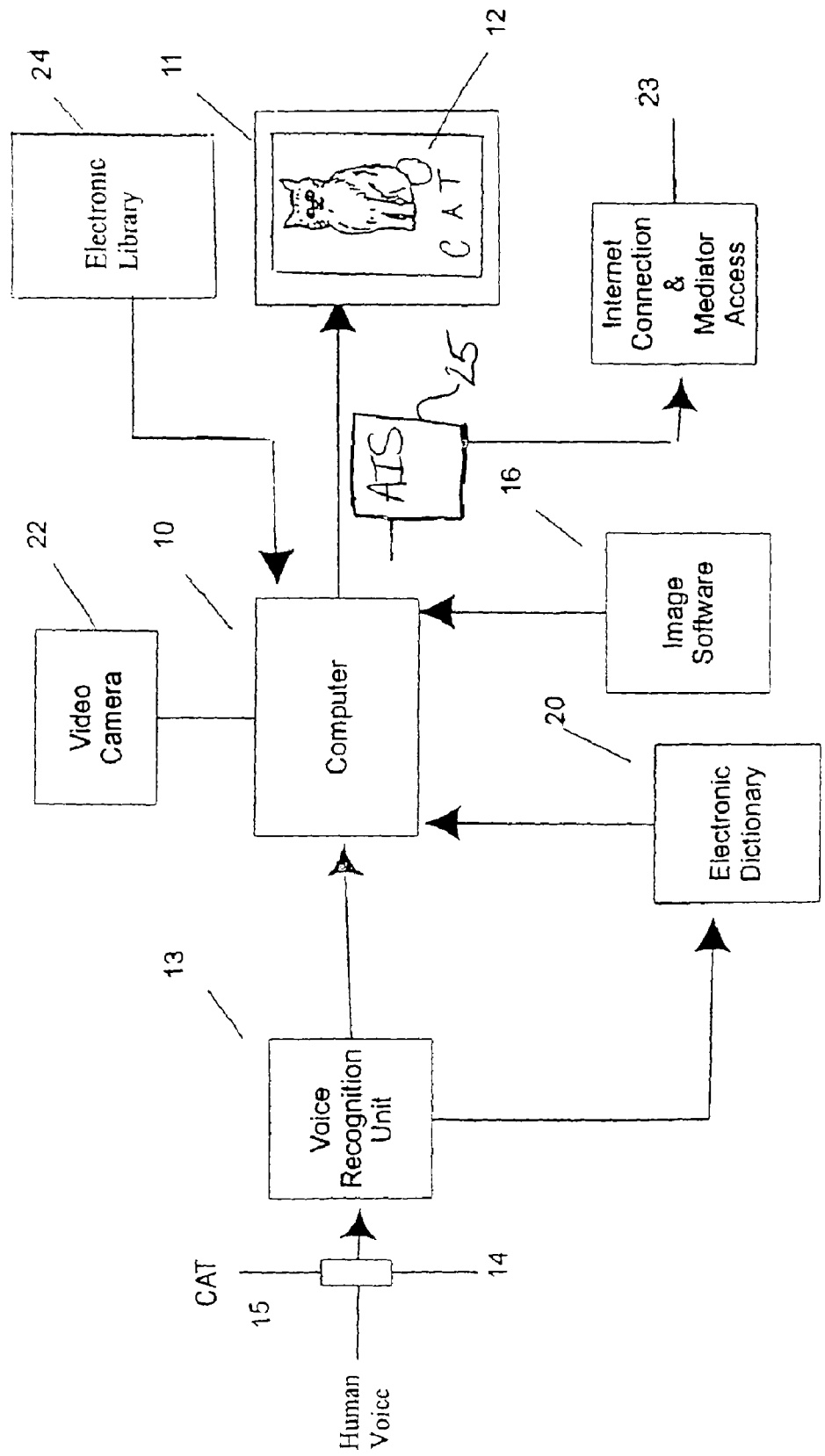
FIG. 2 is a modified version of FIG. 1 which includes an artificial intelligence system for modifying the design of FIG. 1.
Figure 3:
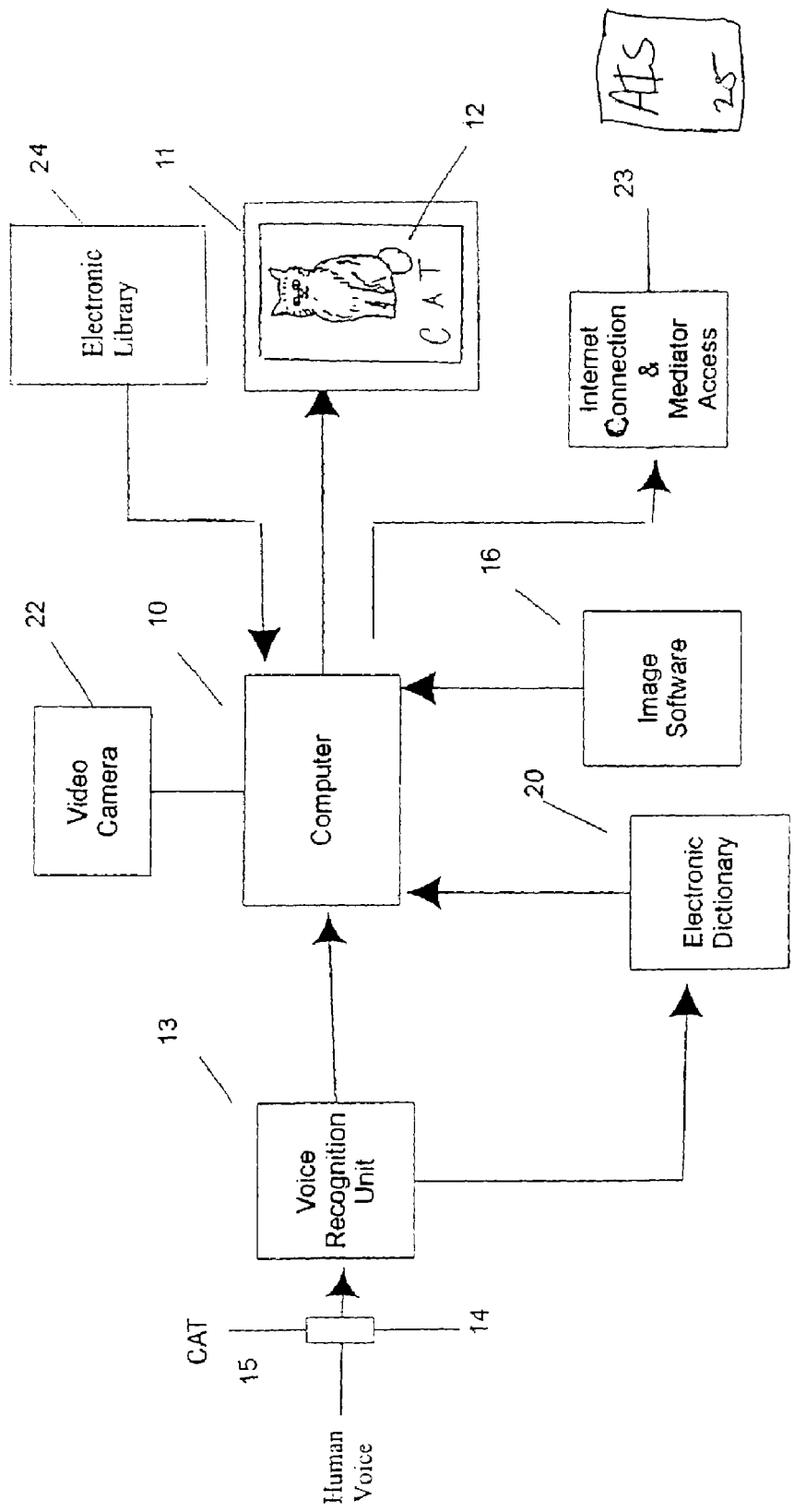
FIG. 3 is a modified embodiment of the version shown in FIG. 2.

Alternative forms or systems for housing the artificial intelligence module or system 25 are shown in FIG. 2 wherein the artificial intelligence system (AIS) 25 is shown as a separate computer which can be general computer that is programmed as an artificial intelligence system which is disposed adjacent to computer 10. FIG. 3 shows AIS 25 disposed offsite but reachable through an internet connection 23.

However, this artificial intelligence system is particularized to recognize incomplete statements, dialects and or modified words of a user and can therefore include a voice learning means.

Figure 4:
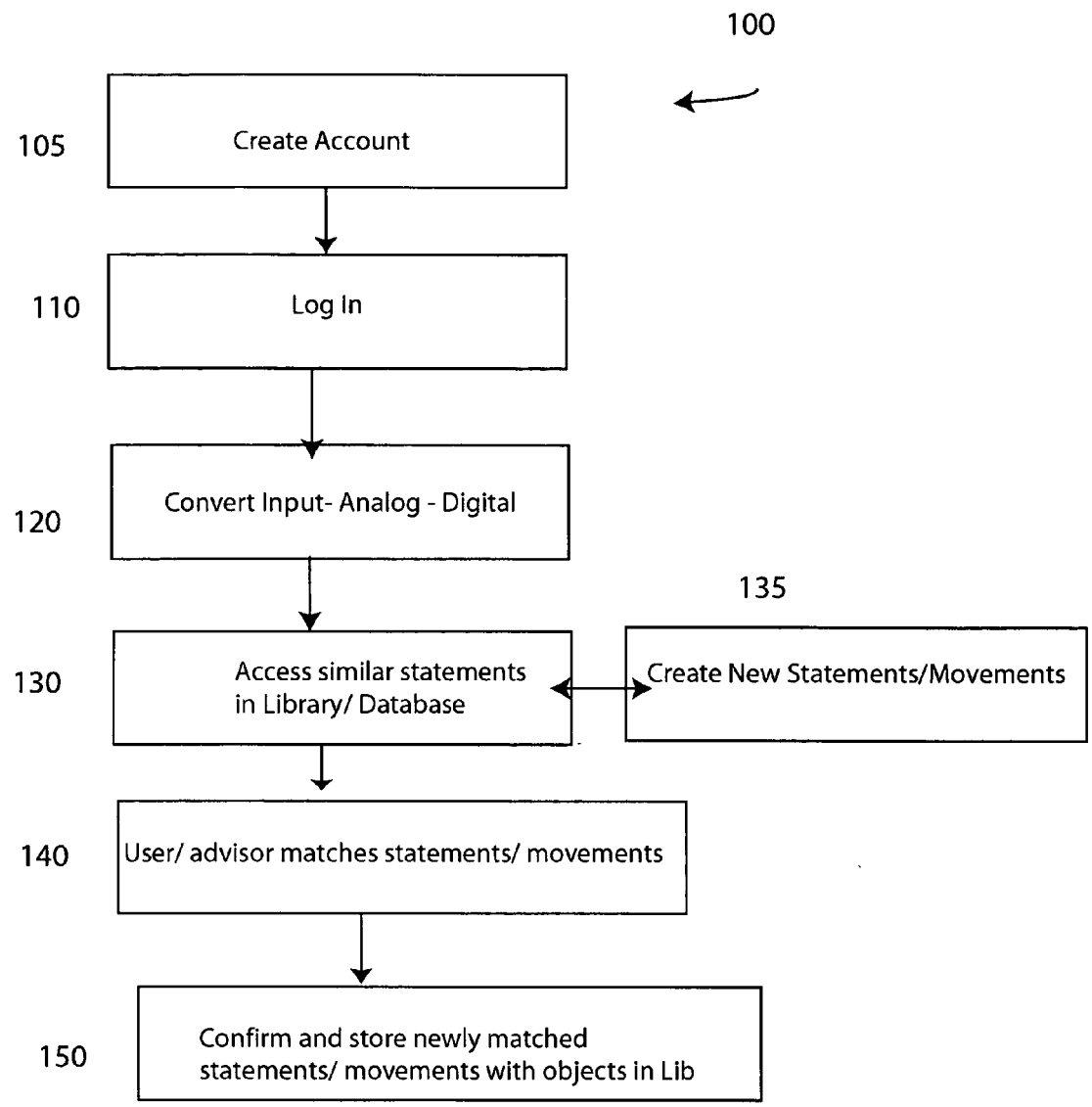
FIG. 4 is a flow chart showing the process for using artificial intelligence to modify and update speech input signals.

The process for a user to update this artificial intelligence system is shown in FIG. 4. For example, a user in step series 100, first creates an account in step 105. Next, the user can log in to the system in step 110 and then start to record voice or other sounds created by the user. Upon the receipt and conversion of these sounds, in step 120, these analog signals can be converted into digital signals wherein these digital signals are then matched to similar phonetic sounds or statements in a stored library or database 24 in step 140.

Next, in step 140 the user or the teacher can selectively match these statements with the library on hand. For example, if the user or student tries to say the word bathroom, and can only utter the term "ba", the teacher who is familiar with the student's mannerisms can selectively match this statement with an archived word taken from the database and image taken from the image library for the student. This selection can be initiated by the user or teacher by a selection of a stored audio sound which can be either the most recent audio sound or an archived sound and then matching this sound with an archived word or phrase stored in library 24. Essentially this selection process can be assisted by a program aiding the teacher in this selection which can be in the form of a user modification means which allows each user great freedom in modifying each selection. Next, in step 150 the teacher or the user can confirm this match and store these newly matched statements or audio signals in the library.

Therefore, in use a student who is struggling with basic words such as "bathroom" can speak the term "ba" wherein if the term "ba" has been matched with "bathroom" by a teacher or a user an image of a bathroom appears on visual display device 12 wherein this image is taken from image software 16 and audio is taken from electronic database or library 24. In this case, the user is then shown the image of the bathroom with the correct pronunciation of bathroom.

This system can also be used to modify the presentation of an instructor for a student. In this case, there can be a visual image customization means which can be in the form of a computer program providing a plurality of instructions to AIS 25. For example with this program, a user or an instructor can log into the system which can be stored on computer 10 or any other computer in communication with computer 10 and enter a profile for an instructor. This profile for the instructor can then be matched to the individual user profiles of any students.

Figure 5:
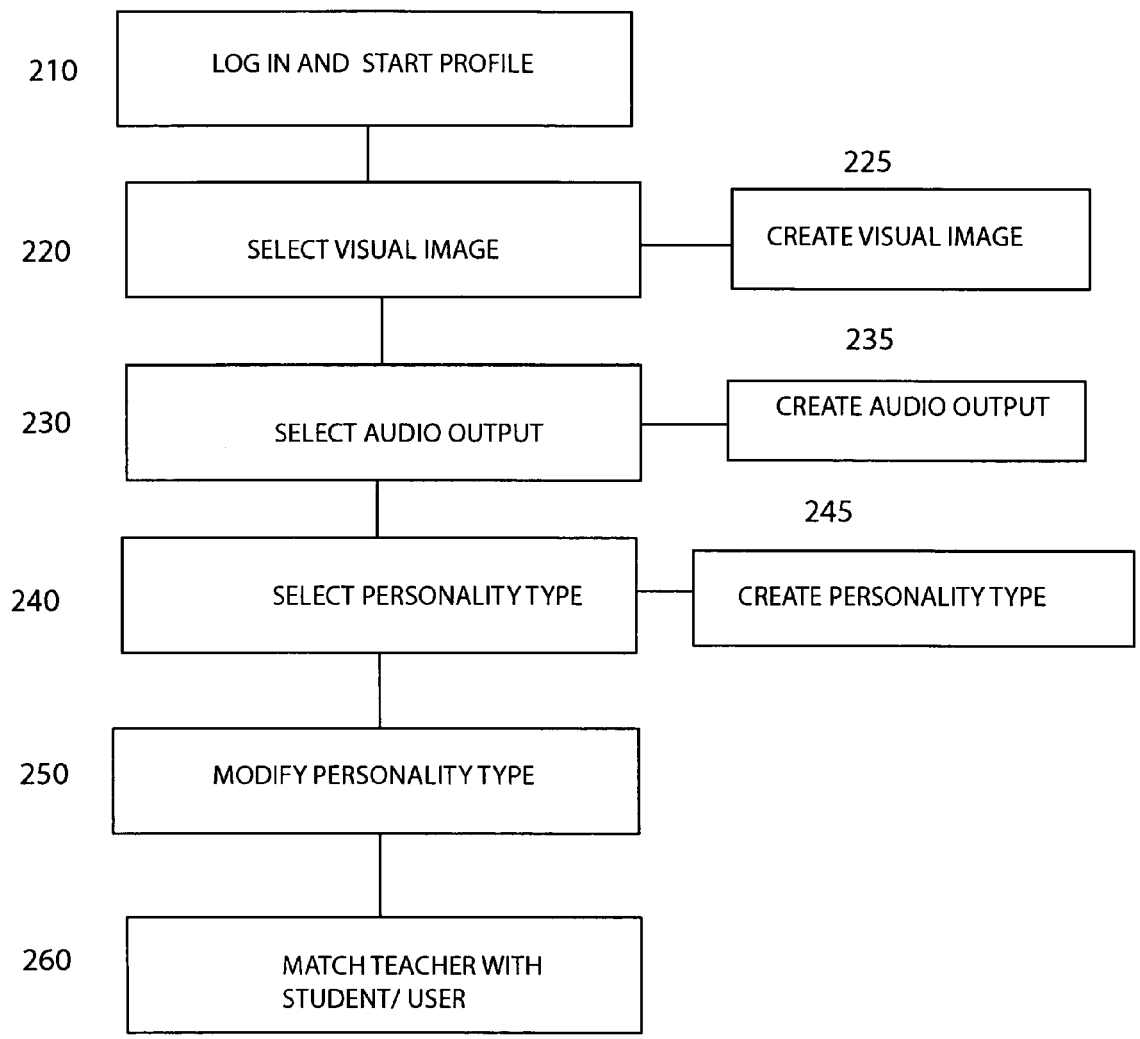
FIG. 5 is a flow chart showing the process for using artificial intelligence to modify and update speech and image output for a user.
Figure 7:
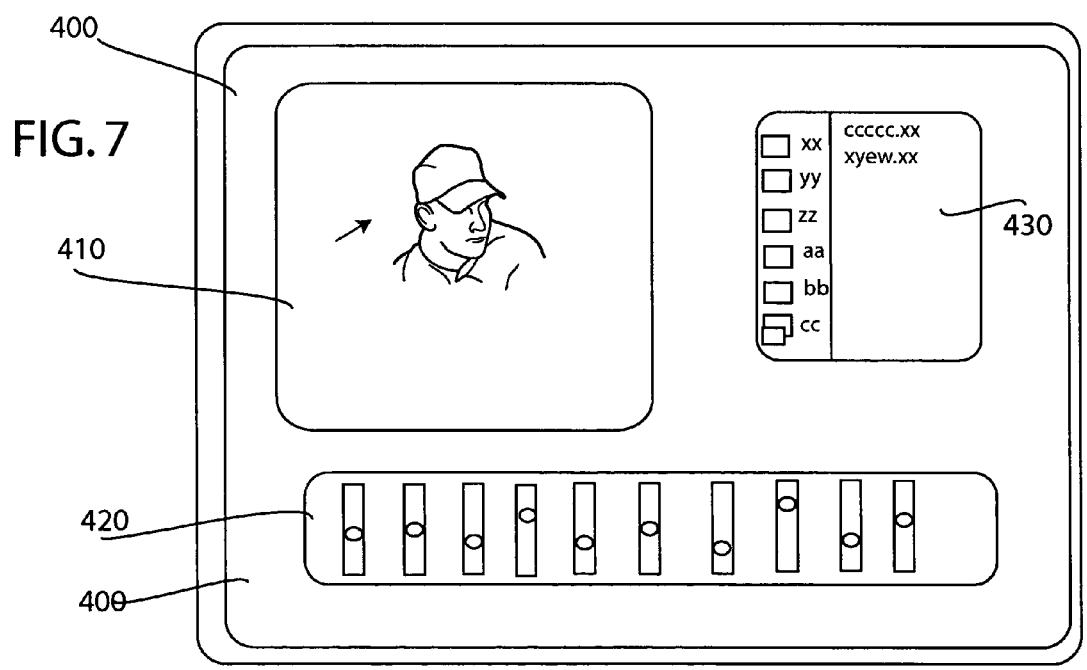
FIG. 7 is an example of a screen that can be used to adjust the image output of the user.

A process for updating the profile of a teacher or presenter is shown in FIG. 5 wherein in step 210, a user can log in and create a basic login name and profile. Next, the teacher or user can select the visual image for presenting the instruction. For example, the user can select the hair color, the skin tone, facial features of a graphical user image for presenting this information. The graphical user image can be in the form of a cartoon, or a substantially realistic graphic animation such as that shown in FIG. 7. This graphical image can be associated with a plurality of visual characteristics which can then be modified based upon a sliding scale. The sliding scale for these different characteristics is shown as adjuster 420 in FIG. 7 in screen 400. For example, if a user picked a file in file field 430 of an image on file, the user could then adjust the characteristics of the image including but not limited to: nose size, eye width, forehead length and width, face length face width, hair color, skin tone etc. Because adjuster 420 is shown as a graphical image that can be adjusted by use of a pointer controlled by a mouse shown on this screen, these characteristics can be programmed, controlled or updated for future additional features.

Alternatively, the user/professor can upload new images, whether graphical images, or actual pictures of a presenter or have a graphical designer in step 225 create new images wherein these images can then be stored in a library. Once the physical presentation has been modified, in step 230 the user can select the audio output.

In this case, the user can create a new voice or select from a set of existing voices which can be stored in electronic library 24. These voices can, in conjunction with a known voice sampling process, be used to provide a customized audio presentation of words to a student.

Figure 6:
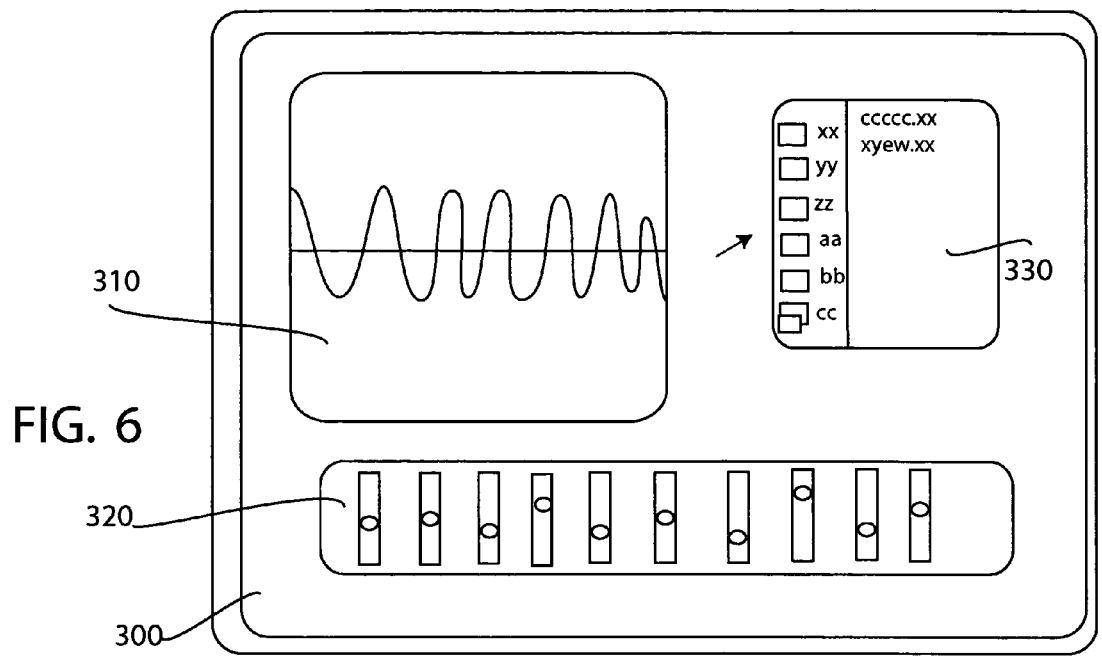
FIG. 6 is an example of a screen used to adjust the speech output of the user.

The customization of the audio output can proceed as follows: the audio input can be received and digitized as a digital file 330 shown in FIG. 6. This digital file can include a voice recording wherein the user can modify or alter the voice recording to match an existing well known voice. One possible means for achieving this is by providing a voice equalizer 320 which can be used to modify different characteristics of a voice signal 310. Each of these characteristics can be associated with a scale that can then be incrementally adjusted on voice equalizer 320. These characteristics may include: cadence, pitch, tonality, treble base, speed, and any other known voice or tone adjusting means.

The teacher or user can also select a particular personality type, such as a particularly expressive, or conservative personality, or a particular personality profile according to a for example, Myers-Briggs standard wherein the actions and the expressions of the teacher are patterned after a particular personality profile. This type of patterning for other uses is known through U.S. Pat. No. 6,185,534 issued on Feb. 6, 2001 the disclosure of which is hereby incorporated herein by reference. Other methods for achieving this purpose are shown in U.S. Pat. No. 5,676,551 issued on Oct. 14, 1997 wherein the disclosure of which is hereby incorporated herein by reference.

For example, different types of personalities can be stored and categorized in electronic library 24. The user can then select that particular personality type, match that personality type with the selected visual image and the sampled voice or audio output wherein these characteristics are then matched to create a final profile in step 260.

These different personality characteristics can be in the form of the following characteristics: political orientation, such as conservative vs. liberal; open minded vs. closed minded; literal vs. suggestive; playful vs. stern; judgemental vs. non-judgemental; sarcastic vs. sincere; intellectual vs. simple; nice vs. curt, along with a level of the sense of humor of the instructor. These characteristics can be controlled via adjuster 420 which due to its graphic nature this adjuster 420 allows for adjustment of many different categories whether visual or personality types.

The adjustment of these personality characteristics can then be used to create a reaction to the responses provided by the student or child which are in response to questions asked by the teacher or professor and also to control or influence movements of the animated teacher once that teacher has been animated. Each of these profiles can be saved so that particular personality sets can be created and then stored for future use and adaptation to any created visual image or audio recording.

In addition, and alternatively, in step 245 a user or teacher can create their own personality type as well. In this case, the user or teacher can create an entirely new personality type combining different customizable personality characteristics.

Once this personality has been customized, the personality could be modified by continuously updating particular characteristics of the user.

Finally, as stated above, in step 260 the teacher or user could match these characteristics to create a final product.

When in use, the student or other user can then provide feedback to the system based upon the experience of the user. Based upon these responses the user or teacher can then adjust the visual images, the voice recordings or the personality of the teacher or animated figure so that this figure is adapted to suit the future needs of the user.

Although the invention has been illustrated by the foregoing disclosure, it is not to be construed as being limited to the material disclosed therein, but rather, it is directed to the generic area as hereinbefore disclosed. Various modifications and embodiments thereof can be made without departing from the spirit or scope thereof.

What is claimed is:

1. A virtual learning system comprising:
   an image library included in a first database that is communicatively coupled to a computer, wherein the image library includes stored images of objects;
   an electronic dictionary included in the first database or in another database communicatively coupled to the computer, wherein the electronic dictionary includes information relating to stored phonetic sounds of words that identify the stored images of objects in the image library and information relating to alphanumeric characters of an alphabet that spell words associated with the stored images of objects in the image library; and
   a voice recognition unit communicatively coupled to the computer, wherein the voice recognition unit is configured to:
     receive a training command to associate future inputs of an utterance with a word that identifies an object, wherein the utterance is different from a pronunciation of the word that identifies the object,
     receive a sound pattern input of the utterance from a user,
     associate the utterance with the word that identifies the object according to the training command, and
     provide a digital recognition output corresponding to the sound pattern input;
   wherein the computer is configured to scan the database to find an entry matching the digital recognition output, and, when a matching entry is found, to present on a display alphanumeric characters representing a word or a sound from the electronic dictionary that corresponds to the digital recognition output and an image from the stored images of objects in the image library that is associated with the word or the sound presented on the display, wherein the image presented on the display corresponds to a graphical representation of an object identified by the word or the sound presented on the display.

2. The virtual learning system of claim 1, further comprising a motion condition generation unit configured to present a predetermined motion condition to the user.

3. The virtual learning system of claim 2, further comprising an evaluation generation unit communicatively coupled to the computer, wherein the evaluation generation unit is configured to generate an evaluation result that is presented on the display, wherein the evaluation result indicates if the indicator presented on the display was moved correctly according to the predetermined motion condition.

4. The virtual learning system of claim 1, further comprising an electronic answer database communicatively coupled to the computer, wherein the electronic answer database includes a plurality of common inquires about the stored images and respective answers to the plurality of common inquiries about the stored images.

5. The virtual learning system of claim 4, wherein the voice recognition unit is configured to receive a second sound pattern input from the user and provide a second digital recognition output in response to the second sound pattern input, wherein the computer is further configured to compare the second digital recognition output to the plurality of common inquiries and present on the display the respective answer to a common inquiry that matches the second digital recognition output.

6. The virtual learning system of claim 5, wherein the computer is further configured to audibly present the answer to the user.

7. The virtual learning system of claim 6, wherein the computer is further configured to present an image of a human on the display that is synchronized with the presentation of the answer.

8. The virtual learning system of claim 7, wherein the computer is further configured to allow the user to customize the image of the human.

9. The virtual learning system of claim 8, wherein the computer is further configured to allow the user to customize a visual appearance of the image of the human.

10. The virtual learning system of claim 8, wherein the computer is further configured to customize an audio or voice output for the image of the human.

11. The virtual learning system of claim 8, wherein the computer is further configured to customize a personality profile for the image of the human.

12. The virtual learning system of claim 1, wherein the computer is further configured to create a profile for a user, wherein the profile is associated with a particular instruction set that corresponds to the user.

13. The virtual learning system of claim 1, further comprising a random access selector communicatively coupled to the computer, wherein the random access selector is configured to receive a request for random access from a user, and select a word from the first database at random in response to the request.

14. The virtual learning system of claim 13, further comprising an audio playback unit communicatively coupled to the computer and configured to play audio content corresponding to the randomly selected word, such that the user hears the randomly selected word spoken by the audio playback unit.

15. A computer-implemented method comprising:
   receiving, at a voice recognition unit, a training command to associate future inputs of an utterance with a word that identifies an object, wherein the utterance is different from a pronunciation of the entire word that identifies the object;

receiving, at the voice recognition unit, a sound pattern input that includes the utterance that is articulated by a user;

associating, at the voice recognition unit, the utterance with the word that identifies the object according to the training command;

providing, via the voice recognition unit, a digital recognition output corresponding to the word that identifies the object to a computer;

scanning, by the computer, a database to find an entry matching the digital recognition output; and in response to finding a matching entry, presenting on a display coupled to the computer alphanumeric characters representing a word or a sound from the database that corresponds to the digital recognition output and an image of an object stored in the database that is associated with the word or the sound presented on the display, wherein the image presented on the display corresponds to a graphical representation of an object identified by the word or the sound presented on the display, and wherein the database is configured to store a plurality of images of objects and information relating to stored phonetic sounds of words that identify the stored plurality of images of objects and information relating to alphanumeric characters of an alphabet that spell words associated with the stored plurality of images of objects.

16. The method of claim 15, further comprising presenting a predetermined motion condition to the user on the display using a motion condition generation unit.

17. The method of claim 16, further comprising generating an evaluation result using an evaluation generation unit and presenting the evaluation result on the display, wherein the evaluation result indicates if the indicator presented on the display was moved correctly according to the predetermined motion condition.

18. The method of claim 15, further comprising:
receiving a second sound pattern input from the user at the voice recognition unit;
providing a second digital recognition output from the voice recognition unit to the computer in response to the second sound pattern input;
comparing, by the computer, the second digital recognition output to a plurality of common inquiries about the images of object stored in the database;
selecting a respective answer that corresponds to the common inquiry that matches the second digital recognition output; and
presenting on the display the respective answer to the common inquiry that matches the second digital recognition output.

19. The method of claim 18, further comprising audibly presenting the respective answer to the user.

20. The method of claim 18, further comprising presenting an image of a human on the display that is synchronized with said presenting the respective answer.

21. The method of claim 15, further comprising customizing, via the computer, the image of the human in response to an input from the user.

22. The method of claim 21, wherein said customizing the image of the human comprises at least one of customizing a visual appearance of the image of the human, customizing an audio or voice output for the image of the human, and customizing a personality profile for the image of the human.

23. The method of claim 15, further comprising creating a profile for a user via the computer, wherein the profile is associated with a particular instruction set that corresponds to the user.

24. The method of claim 15, further comprising detecting the movement of the user using the video camera.

25. A virtual learning system comprising:
an image library included in a first database that is communicatively coupled to a computer, wherein the image library includes stored images of objects;
an electronic dictionary included in the first database or in another database communicatively coupled to the computer, wherein the electronic dictionary includes information relating to stored phonetic sounds of words that identify the stored images of objects in the image library and information relating to alphanumeric characters of an alphabet that spell words associated with the stored images of objects in the image library; and
a voice recognition unit communicatively coupled to the computer, wherein the voice recognition unit is configured to:
receive a training command to associate future inputs of an utterance with a word that identifies an object, wherein the utterance is different from a pronunciation of the word that identifies the object,
receive a sound pattern input of the utterance from a user, associate the utterance with the word that identifies the object according to the training command, and
provide a digital recognition output corresponding to the sound pattern input;
wherein the computer is configured to scan the database to find an entry matching the digital recognition output, and, when a matching entry is found, to present on a display alphanumeric characters representing a word or a sound from the electronic dictionary that corresponds to the digital recognition output and an image from the stored images of objects in the image library that is associated with the word or the sound presented on the display.

26. The virtual learning system of claim 25, wherein the utterance is a pronunciation of only a portion of the word that identifies the object.

27. The virtual learning system of claim 25, wherein the voice recognition unit is further configured to receive a training command to permanently associate the utterance with the word that identifies the object.

28. The virtual learning system of claim 25, further comprising an electronic answer database communicatively coupled to the computer, wherein the electronic answer database includes a plurality of common inquires about the stored images and respective answers to the plurality of common inquiries about the stored images.

29. The virtual learning system of claim 28, wherein the voice recognition unit is configured to receive a second sound pattern input from the user and provide a second digital recognition output in response to the second sound pattern input, wherein the computer is further configured to compare the second digital recognition output to the plurality of common inquiries and present on the display the respective answer to a common inquiry that matches the second digital recognition output.

30. The virtual learning system of claim 29, wherein the computer is further configured to audibly present the answer to the user.

31. The virtual learning system of claim 30, wherein the computer is further configured to present an image of a human on the display that is synchronized with the presentation of the answer.

32. The virtual learning system of claim 31, wherein the computer is further configured to allow the user to customize at least one of a visual appearance of the image of the human, an audio or voice output for the image of the human, or a personality profile for the image of the human.

33. The virtual learning system of claim 25, wherein the computer is further configured to create a profile for a user, wherein the profile is associated with a particular instruction set that corresponds to the user.

34. The virtual learning system of claim 25, wherein the computer is configured to receive from a user selection of an image that is to correspond to the utterance.

35. A computer-implemented method of teaching a user who is unable to articulate a word normally associated with a given object, the method comprising:
   sending, to a voice recognition unit, a training command to associate future inputs of an utterance with a word that identifies an object, wherein the utterance is different from a pronunciation of the entire word that identifies the object;
   sending the voice recognition unit a voice input of the utterance that is articulated by a user;
   causing the voice recognition unit to associate the utterance with the word that identifies the object according to the training command;
   receiving, from the voice recognition unit, a digital recognition result corresponding to the word that identifies the object;
   retrieving at least one of an image associated with the word, a textual representation of the word, and an audible representation of the word from a database by comparing the digital recognition result to a plurality of possible results stored in a database; and
   presenting the at least one of the image, the textual representation, and the audible representation to the user in response to the utterance using a display.

36. The method of claim 35, wherein sending the voice recognition unit a voice input of the utterance includes sending the voice recognition unit data representing a pronunciation of only a portion of the word that identifies the object.

37. The method of claim 35, wherein said sending a training command comprises sending a training command to permanently associate the utterance with the word that identifies the object.

38. The method of claim 35, wherein said sending a training command comprises sending a selection of an image that corresponds to the object from an image library and causing association of the utterance with the word that identifies the image.

39. The method of claim 35, further comprising:
   sending a sound pattern input from the user to the voice recognition unit;
   receiving a second digital recognition result from the voice recognition unit in response to the sound pattern input;
   comparing, by the computer, the second digital recognition result to a plurality of inquiries about the images of object stored in the database;
   selecting a respective answer that corresponds to the inquiry that matches the second digital recognition result; and
   presenting on the display the respective answer to the inquiry that matches the second digital recognition result.

40. The method of claim 39, further comprising audibly presenting the respective answer to the user.

41. The method of claim 40, further comprising presenting an image of a human on the display that is synchronized with said presenting the respective answer.

42. The virtual learning system of claim 1, further comprising:
   a video camera configured to detect movement of the user; and
   a movement recognition unit communicatively coupled to the computer and configured to receive information representative of the movement detected by the video camera, and cause an indicator presented on the display to move according to the movement of the user.

43. The method of claim 15, further comprising:
   receiving information representative of movement of the user detected by a video camera at a movement recognition unit; and
   causing, via a movement recognition unit, an indicator presented on the display to move according to the movement of the user.

44. A tangible computer-readable medium having instructions stored thereon, the instructions comprising:
   instructions for sending, to a voice recognition unit, a training command to associate future inputs of an utterance with a word that identifies an object, wherein the utterance is different from a pronunciation of the entire word that identifies the object;
   instructions for sending the voice recognition unit a voice input of the utterance that is articulated by a user;
   instructions for causing the voice recognition unit to associate the utterance with the word that identifies the object according to the training command;
   instructions for receiving, from the voice recognition unit, a digital recognition result corresponding to the word that identifies the object;
   instructions for retrieving at least one of an image associated with the word, a textual representation of the word, and an audible representation of the word from a database by comparing the digital recognition result to a plurality of possible results stored in a database; and
   instructions for causing presentation of the at least one of the image, the textual representation, and the audible representation to the user in response to the utterance.

* * * * *

UNITED STATES PATENT AND TRADEMARK OFFICE
CERTIFICATE OF CORRECTION

PATENT NO. : 8,202,094 B2
APPLICATION NO. : 10/983066
DATED : June 19, 2012
INVENTOR(S) : Spector Page 1 of 1

It is certified that error appears in the above-identified patent and that said Letters Patent is hereby corrected as shown below:

IN THE SPECIFICATIONS:

In Column 2, Lines 28-29, delete "preprogammed" and insert -- preprogrammed --, therefor.

In Column 4, Line 36, delete "DESCRIPTION" and insert -- DETAILED DESCRIPTION --, therefor.

In Column 6, Line 67, delete "analog-to-digital converter D/A." and insert -- analog-to-digital converter A/D. --, therefor.

In Column 8, Line 38, delete "immediately" and insert -- immediately. --, therefor.

Signed and Sealed this
Sixteenth Day of October, 2012

David J. Kappos
*Director of the United States Patent and Trademark Office*